United States Patent Office 2,898,625
Patented Aug. 11, 1959

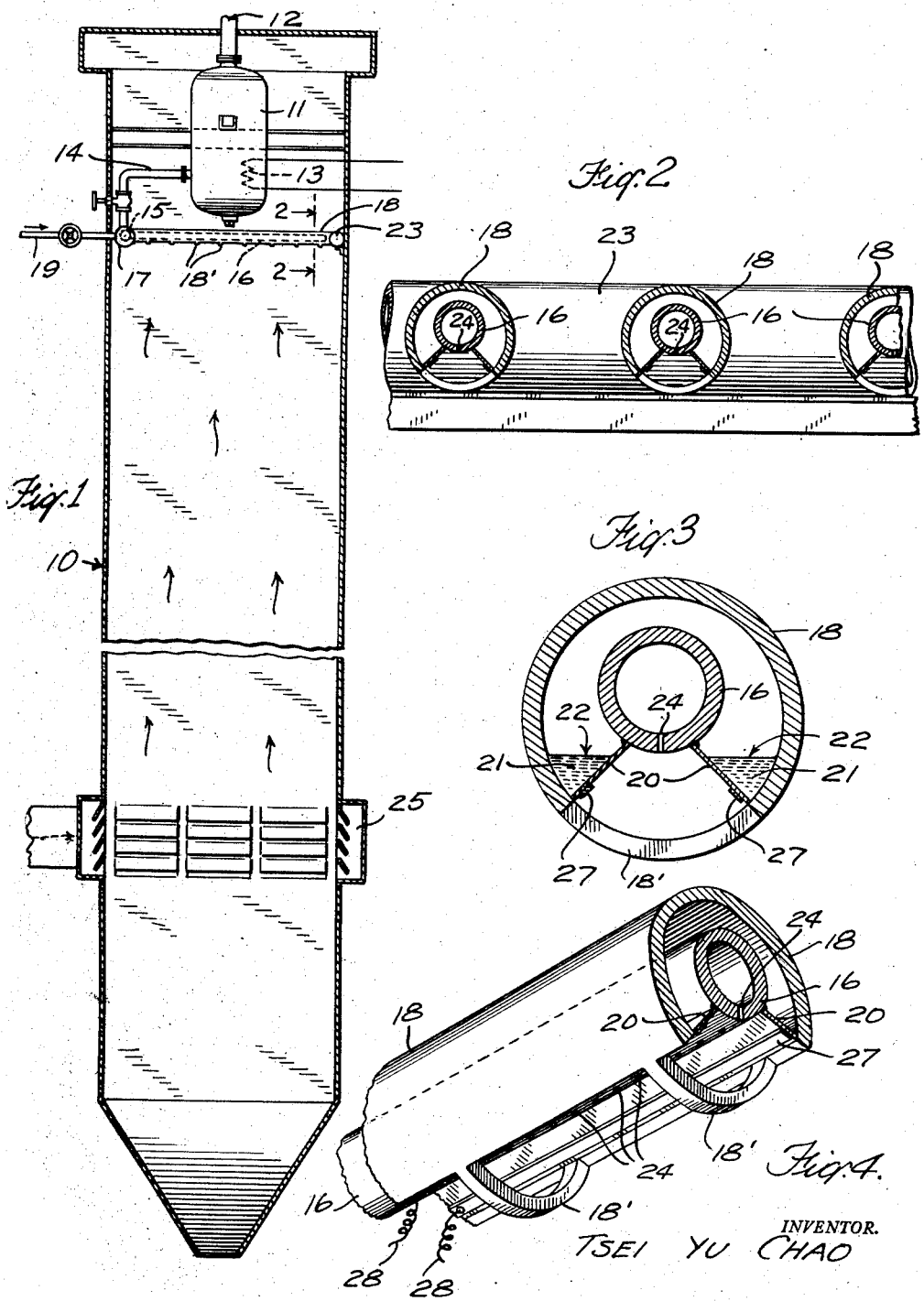

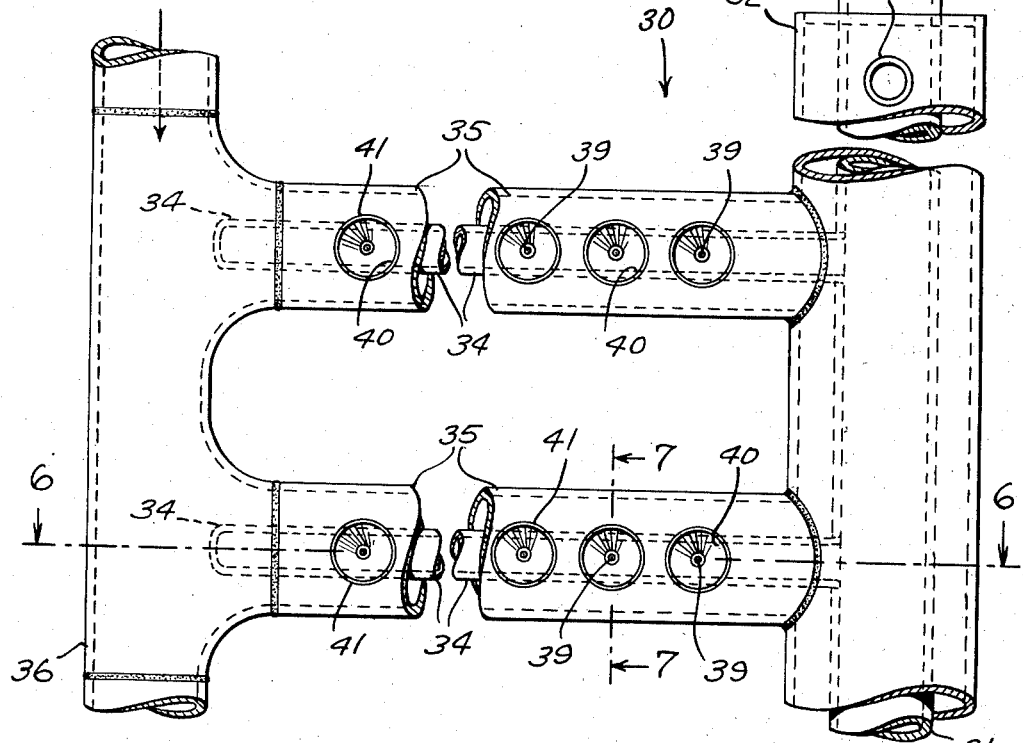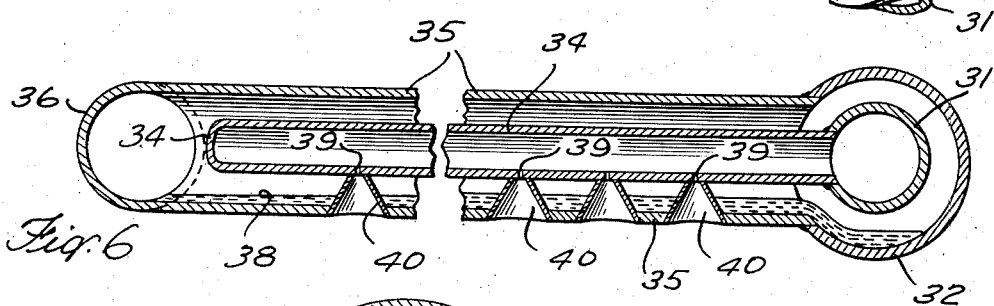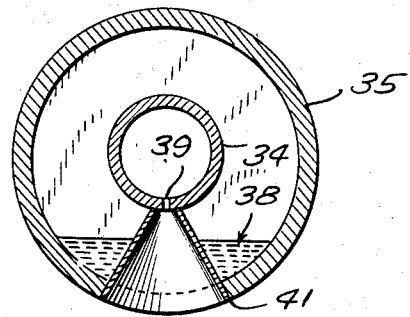

2,898,625

PELLET FORMING APPARATUS

Tsei Yu Chao, New York, N.Y., assignor to Foster Wheeler Corporation, New York, N.Y., a corporation of New York Application June 10, 1953, Serial No. 360,700

5 Claims. (Cl. 18—2.7)

This invention relates to the treatment of molten materials and more particularly to apparatus for the prilling of such materials.

In apparatus for prilling a molten material or liquid, a molten compound or heated concentrated solution thereof is introduced to the top of a spray tower and is discharged downwardly through spray nozzles of a prilling header in droplet form countercurrent to a flow of gaseous cooling medium. During its travel downwardly the droplets are cooled and solidify into substantially spherical shaped particles or prills.

To insure optimum operation of a prilling tower in the formation of prills having the desired physical and chemical characteristics, at least two factors must be taken into consideration; one is the temperature of the molten liquid; and the other is the prevention of freezing or clogging of the spray nozzles, or orifices, in the prilling header. With regard to the first factor, the temperature must be held within certain limits because if it is too high the prills may collect in the base of the tower as a pasty mass whereas if the temperature is too low the sprayed particles will solidify before assuming substantially spherical shape. In the case of some materials, as for example fertilizers, such as urea, too high a temperature results in the decomposition of urea to biuret which is undesirable because of the consequent loss of nitrogen. With regard to the second factor, clogging of the spray nozzles occurs when the temperature of the molten compound in the prilling header falls below the melting point. It also has been found from experience that clogging of the nozzles occurs because the cooling medium in passing upwardly through the tower cools the air adjacent the nozzle so as to solidify the compound as the latter discharges from the nozzles.

The present invention contemplates a spraying tower wherein novel prilling apparatus is provided to form prills or substantially spherical shaped particles of desired physical and chemical characteristics.

The present invention further contemplates novel prilling apparatus wherein the molten material is maintained above its melting point when discharging through the spray nozzles, or orifices, to thereby obviate clogging of the orifices.

The present invention will be better understood from a consideration of the detailed description which follows taken together with the accompanying drawings wherein several embodiments of the invention are illustrated.

In the drawings:

Fig. 1 is more or less a diagrammatic view of a spray tower in which the invention is embodied;

Fig. 2 is an enlarged view, in section, of a header arrangement taken along line 2—2 of Fig. 1;

Fig. 3 is an enlarged view, in section, of one of the individual headers of Fig. 2;

Fig. 4 is an enlarged isometric view of an individual header;

Fig. 5 is a bottom view of a header arrangement embodying a second embodiment of the present invention;

Fig. 6 is a section taken along line 6—6 of Fig. 5 and rotated 180° from the position in Fig. 5;

Fig. 7 is a section taken along line 7—7 of Fig. 5 and rotated 180° from the position in Fig. 5.

For purposes of illustration the present invention will be described hereinafter in connection with the prilling of molten liquid urea but it is to be understood that any other like material, as for example, mixtures of ammonium nitrate and ammonium phosphate may be prilled by the present invention.

Referring now to the drawings for a more detailed description of the present invention and more particularly to Fig. 1 wherein one embodiment hereof is clearly illustrated, a spray tower generally designated by the numeral 10, has provided therein a storage tank 11 which is supplied with concentrated urea solution by a conduit 12 connected to a source of urea solution (not shown); the temperature of the solution being such as to maintain the urea liquid, but below the temperature at which urea decomposes. A steam heating coil 13 is arranged in tank 11 to maintain the solution at the desired temperature. A conduit 14 communicates tank 11 with a distribution header 15 shown in broken lines in Fig. 1 which in turn communicates with a plurality of horizontally arranged headers or tubes 16, one of which is shown in broken lines. Header 15 is arranged within an outer distribution header 17 which latter header communicates with a plurality of horizontally arranged outer headers or tubes 18 in which the tubes 16 are eccentrically disposed (Figs. 2, 3, and 4). A pipe 19 is connected to outer header 17 and conducts a heated vapor, as for example steam, to the header 17 and in turn to tubes 18. With the foregoing arrangement, the molten urea solution is fed to inner tubes 16 while heated vapor is fed to outer tubes 18, which heated vapor is in heat exchange relationship with the urea in tube 16 to maintain it above its melting point but below the decomposition temperature.

Tubes 18 each have lower cut-out sections which extend longitudinally of the pipe and bounded by ribs 18'. A pair of longitudinally extending partitions or baffles 20 join the inner tube 16 with the outer tube 18 adjacent the cut-out section in a fluid-tight manner and provide a condensate collecting well or trough 21 defined by the partitions and a portion of the inner wall surface of tube 18. The baffles 20 may be secured to the tubes in any suitable manner, as for example by welding. It may be readily understood that since the heated vapor is in heat exchange relationship with the urea in tubes 16 a certain amount of condensate will form, which condensate collects in well 21 (Fig. 3) and is designated by the numeral 22. A condensate outlet (not shown) is connected to a condensate collector header 23 (Fig. 1) which communicates with outer tubes 18 for carrying away condensate. The condensate outlet is connected by suitable conduit means (not shown) to a conventional vapor or steam trap (not shown).

A plurality of longitudinally spaced nozzles or orifices 24 (Figs. 3 and 4) are formed in the bottom of each tube 16 for discharging urea in droplet form downwardly in tower 10. Air inlets 25 are provided adjacent the bottom of tower 10 to cause flow of cool air upwardly in the tower and the air is drawn out of the latter by exhaust fans (not shown) located adjacent the drum 11. It has been found that in towers of sufficient height, fans are not required since there is a draft such as occurs in chimneys, and accordingly, the fans may be dispensed with in tower 10, if deemed expedient. The air in flowing upwardly passes countercurrent and in contact with the falling droplets to cause the latter to solidify in the shape of substantially spherical particles, or prills, in a manner well known to those skilled in the art. Arranged on the under side of each baffle 20 is a longitudinally extending heater strip 27 which is connected by a lead 28 to a suitable source of energy. Upon energization of the strips the baffles become heated and energy in the form of heat is given off to the space between the baffles and adjacent the orifices, and to the condensate collected in the troughs for a purpose to be presently set forth.

In operation, a concentrated solution of urea heated above its melting point and with a water content which may range from 0.5% to 4% is fed to tank 11 where the solution is maintained above the melting point by heating coil 13. As explained hereinbefore, the urea is fed to tubes 16 and discharged in droplet form from orifices 24 into the tower wherein the droplets are solidified by the cold air passing in contact therewith. Ribs 18' are arranged between pairs of orifices 24 so that the droplets do not contact the ribs when discharged from the orifices. The rate of discharge of condensate through the condensate outlet (not shown) is not sufficient to remove the condensate as it is formed and for that reason, a certain amount of condensate will always collect in tube 18. Since the condensate is at a lower temperature than the vapor, tubes 16 are disposed eccentrically of outer tubes 18 and toward the upper portion thereof so as to be out of contact with the relatively cooler condensate. It is particularly required that the condensate does not contact and cool the portions of inner tubes 16 adjacent the orifices because such cooling will cause solidification of the urea at the orifices to thereby cause clogging of the latter. To further prevent the orifices from being clogged, heating strips 27 heat the baffles and the air space therebetween to a temperature at or slightly above the melting point temperature. It may be readily appreciated that without heating strips 27 heat will tend to flow from the portions of tubes 16, adjacent the orifices, to the baffles between the latter will be at a lower temperature than said portions due to the upwardly flowing cool air. However, when the baffles are heated by strips 27, the temperature differential is little and the portions of tubes 16 around the orifices will not be cooled to any appreciable extent. Since heat is also given off to the air space between the baffles, the urea at the orifices will not tend to solidify and therefore, the orifices will be free of clogging. In heating the baffles, the strips also heat the condensate to prevent excessive cooling thereof; it being understood that such excessive cooling would decrease the temperature of the heated vapor to thereby cause formation of more than the usual amount of condensate and some decrease in temperature of the urea in pipe 16.

A second embodiment of the invention is illustrated in Fig. 5 and comprises a header arrangement 30 similar in many respects to the header arrangement of the first embodiment and is arranged in tower 10 preferably in the same location as is the header arrangement of Figs. 1-4. Conduit means (not shown) conduct molten liquid, as for example, urea, from a tank to a distribution header 31 (Fig. 5) eccentrically disposed in a condensate collector header 32, which header has a condensate outlet coupling 33 connected thereto. Header 31 communicates with a plurality of laterally spaced and horizontally arranged headers or tubes 34, two of which are partly shown in Fig. 5 to conduct urea thereto. The tubes 34 are eccentrically disposed in outer headers or tubes 35 (Figs. 6 and 7) which communicate condensate collector header 32 with a header 36 connected to a source of heated vapor, as for example steam. Heated vapor enters header 36 and passes into outer tubes 35 where the vapor is in heat exchange relationship with the urea in tubes 34 to maintain the temperature of the urea above its melting point. The condensate formed in outer tube 35 flows from the latter into collector header 32 and then is discharged therefrom by way of condensate outlet 33. Tubes 34 are arranged in outer tubes 35 so as to be out of contact with the condensate (designated by the numeral 38) formed in tubes 35 and the first mentioned tubes have spray nozzles or orifices 39 through which the urea is discharged in droplet form for subsequent solidification in tower 10 as substantially spherical shaped particles or prills. Frusto-conical pipe members 40 join the lower portions of tube 34 and of tube 35 in a fluid-tight manner and communicate orifices 39 with openings 41 formed in tubes 35 (Figs. 5–7), whereby urea discharged through the orifices passes through the openings.

From the foregoing construction, it may be seen that the header arrangement of the second embodiment differs from the header arrangement of the first embodiment in that the former does not have an outer tube with longitudinally extending cutout sections together with baffles joining the inner and outer tubes, and in addition, heating strips in intimate contact with the baffles. The orifices of the second embodiment have less tendency to clog because of the frusto-conical shape pipes which admit less cooling air to the space adjacent the orifices. Furthermore, the combined surface area of the frusto-conical shaped members as compared with the surface area of the baffles 20 is much less so that less heat is withdrawn from the portions of the inner tube around the orifices than would be the case when baffles are used without heating strips. It may also be appreciated that the surface in contact with the condensate and exposed to cool air is much less in the second embodiment than in the first embodiment. Frusto-conical shape pipes have been selected rather than cylindrical pipes for the reason that more of the immediate surface of the inner tube around the orifices is subjected to the heated vapor.

It may be readily understood from the foregoing that the present invention provides novel prilling apparatus wherein clogging of prilling orifices is substantially eliminated. The provision of a prilling header or tube out of contact with the condensate formed in the outer tube and the utilization of heating strips or frusto-conical pipe members maintain the orifices free of clogging so as to provide a prill having the desired physical and chemical characteristics.

Although two embodiments of the invention have been illustrated and described in detail, it is to be expressly understood that the invention is not limited thereto. Various changes may be made in the design and arrangement of parts without departing from the spirit and scope of the invention as will now be understood by those skilled in the art.

I claim:

1. A header for apparatus for forming substantially spherical droplets from a mass of molten material comprising a generally horizontal conduit having a droplet-forming orifice in its bottom; a condensible vapor-receiving jacket on said conduit having its bottom spaced from the bottom of the conduit, the bottom of the jacket having an opening therein aligned with said orifice, said opening being larger than said orifice and larger than the droplet formed thereby; and an imperforate partitioning means connected in fluid-tight relationship with said conduit and said jacket and enclosing a space through which the droplets fall freely from said orifice through said opening.

2. The combination defined in claim 1 in which the conduit has a longitudinal series of droplet-forming orifices in its bottom and the bottom of said jacket has a longitudinal series of openings, each opening being aligned with a corresponding orifice and said partitioning means comprises a series of tubular members, one associated with each orifice and the opening aligned therewith.

3. The combination defined in claim 2 in which said tubular members are frustoconical, the smaller end engaging the conduit.

4. The combination defined in claim 1 in which the conduit has a longitudinal series of orifices in its bottom and said jacket has a longitudinally extending opening in its bottom aligned with said series of orifices and said partitioning means including a pair of longitudinal plates, the plates being on opposite sides of said opening.

5. The combination defined in claim 4 and heater means mounted on at least one of said plates.

References Cited in the file of this patent

UNITED STATES PATENTS

| | | |
|---|---|---|
| 1,773,257 | Buse | Aug. 19, 1930 |
| 1,922,259 | Paradise | Aug. 15, 1933 |
| 2,528,407 | Yeandle | Oct. 31, 1950 |
| 2,714,224 | Schaub | Aug. 2, 1955 |

FOREIGN PATENTS

| | | |
|---|---|---|
| 263,870 | Great Britain | Nov. 3, 1927 |

UNITED STATES PATENT OFFICE
CERTIFICATE OF CORRECTION

Patent No. 2,898,625                          August 11, 1959

Tsei Yu Chao

It is hereby certified that error appears in the printed specification of the above numbered patent requiring correction and that the said Letters Patent should read as corrected below.

Column 3, line 47, for "between" read -- because --; column 4, line 69, after "and" insert -- with --.

Signed and sealed this 4th day of April 1961.

SEAL)
.ttest:     ERNEST W. SWIDER

A̶B̶X̶A̶X̶ A̶X̶A̶I̶N̶X̶
ttesting Officer

ARTHUR W. CROCKER
                                Acting Commissioner of Patents